United States Patent [19]

Buschbom et al.

[11] Patent Number: 4,465,409

[45] Date of Patent: Aug. 14, 1984

[54] SILO UNLOADER

[75] Inventors: Floyd E. Buschbom, Long Lake; Glen D. Hansen, Maple Plain, both of Minn.

[73] Assignee: Veda, Inc., Long Lake, Minn.

[21] Appl. No.: 343,024

[22] Filed: Jan. 27, 1982

[51] Int. Cl.³ .................. B65G 65/38; B65G 53/48
[52] U.S. Cl. ............................... 406/59; 406/114; 414/316; 414/322
[58] Field of Search ................... 406/57-59, 406/80, 114; 414/316, 320, 322

[56] References Cited

U.S. PATENT DOCUMENTS

| | | | |
|---|---|---|---|
| 2,995,260 | 8/1961 | McCann et al. | 406/59 X |
| 3,090,506 | 5/1963 | Buschbom | 414/316 |
| 3,223,256 | 12/1965 | Buschbom | 406/59 X |
| 3,301,412 | 1/1967 | Buschbom | 414/320 |
| 4,170,385 | 10/1979 | Buschbom et al. | 406/59 |
| 4,329,105 | 5/1982 | Buschbom et al. | 414/316 |

Primary Examiner—Jeffrey V. Nase
Attorney, Agent, or Firm—Burd, Bartz & Gutenkauf

[57] ABSTRACT

A top unloading silo unloader pendently supported in a tower silo. The unloader has a material collector moved around the silo with leading and trailing drive wheels. An impeller receives material from the collector and throws the material into an out chute which directs the material to a doorway leading to an upright passageway. The drive wheels are mounted on opposite ends of a rocker arm rotatably supported on a support. The support is connected to the impeller housing. Power is applied to both wheels by separate drive shafts connected to a gear box. A collector leveling apparatus has a linear actuator connected to the unloader frame. A cable connects the linear actuator with the outer end of the collector and the support in a manner so that the outer end of the collector can be raised or lowered and held in a selected position in response to operation of the actuator. The linear actuator has a reversible electric motor coupled to a motor controller. A reference arm attached to the rotating part of the unloader is linked to the controller so that movement of the collector up or down actuates the controller, whereby the motor operates the linear actuator to reduce its overall length to raise the outer end of the collector or to increase its overall length to lower the outer end of the collector thereby maintaining the outer end of the collector at a selected position.

53 Claims, 10 Drawing Figures

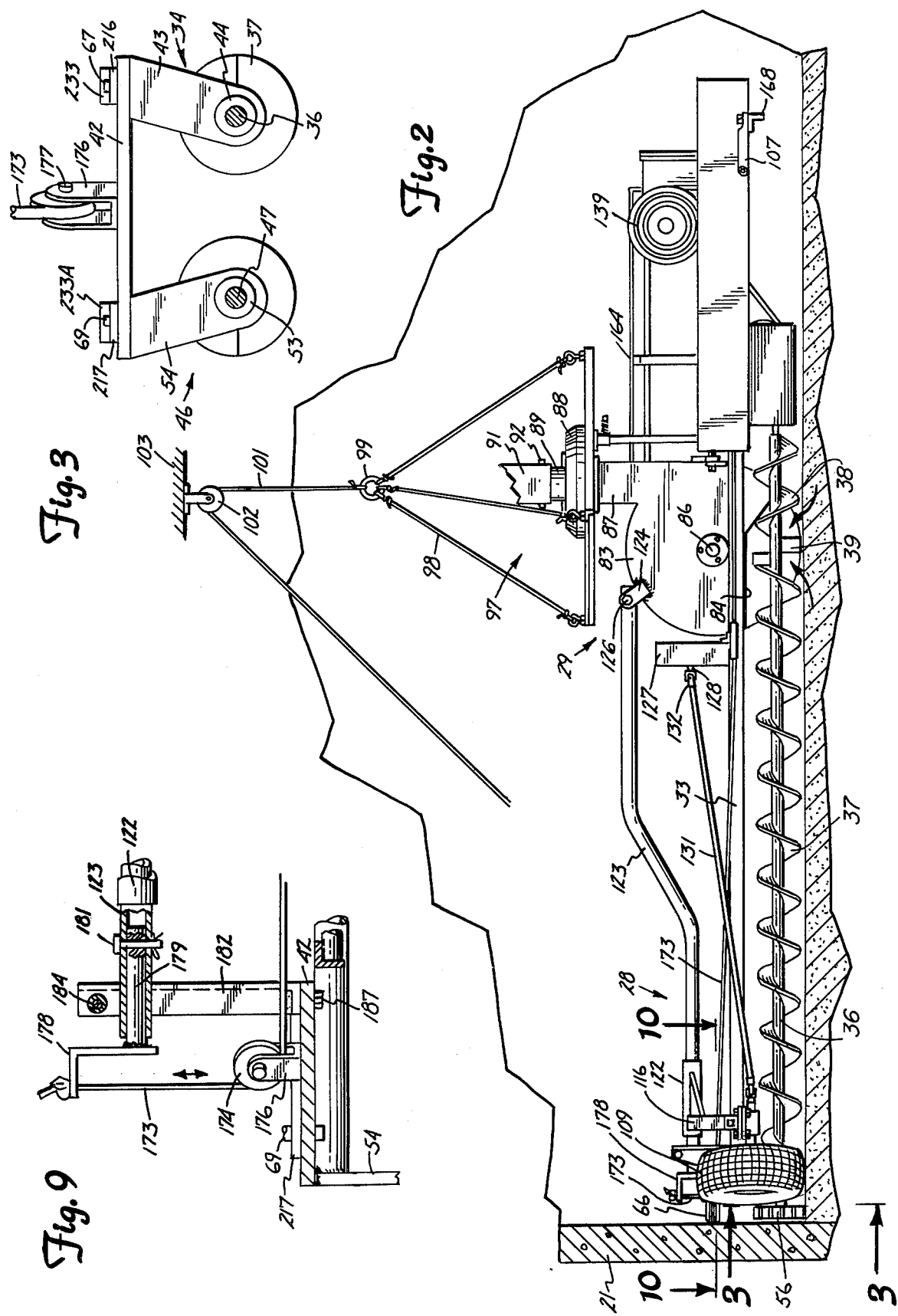

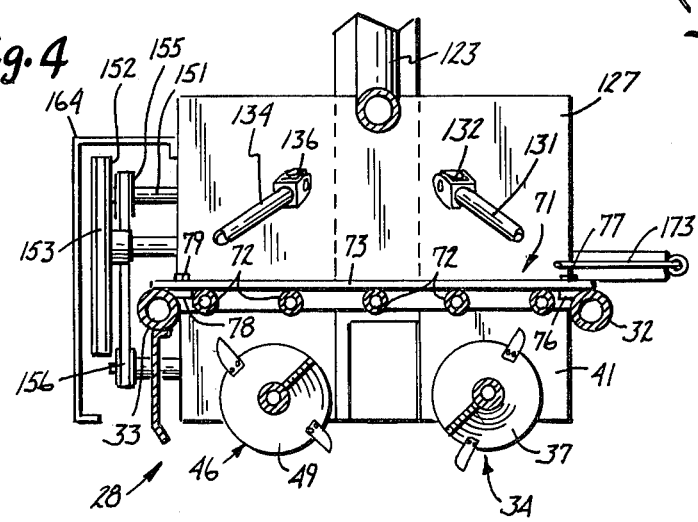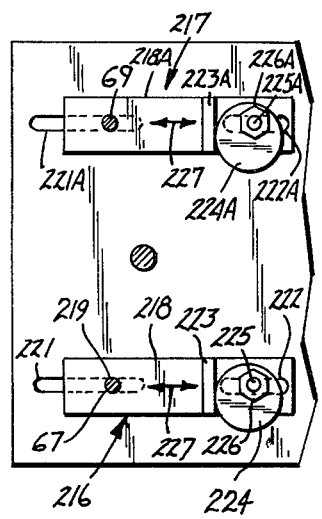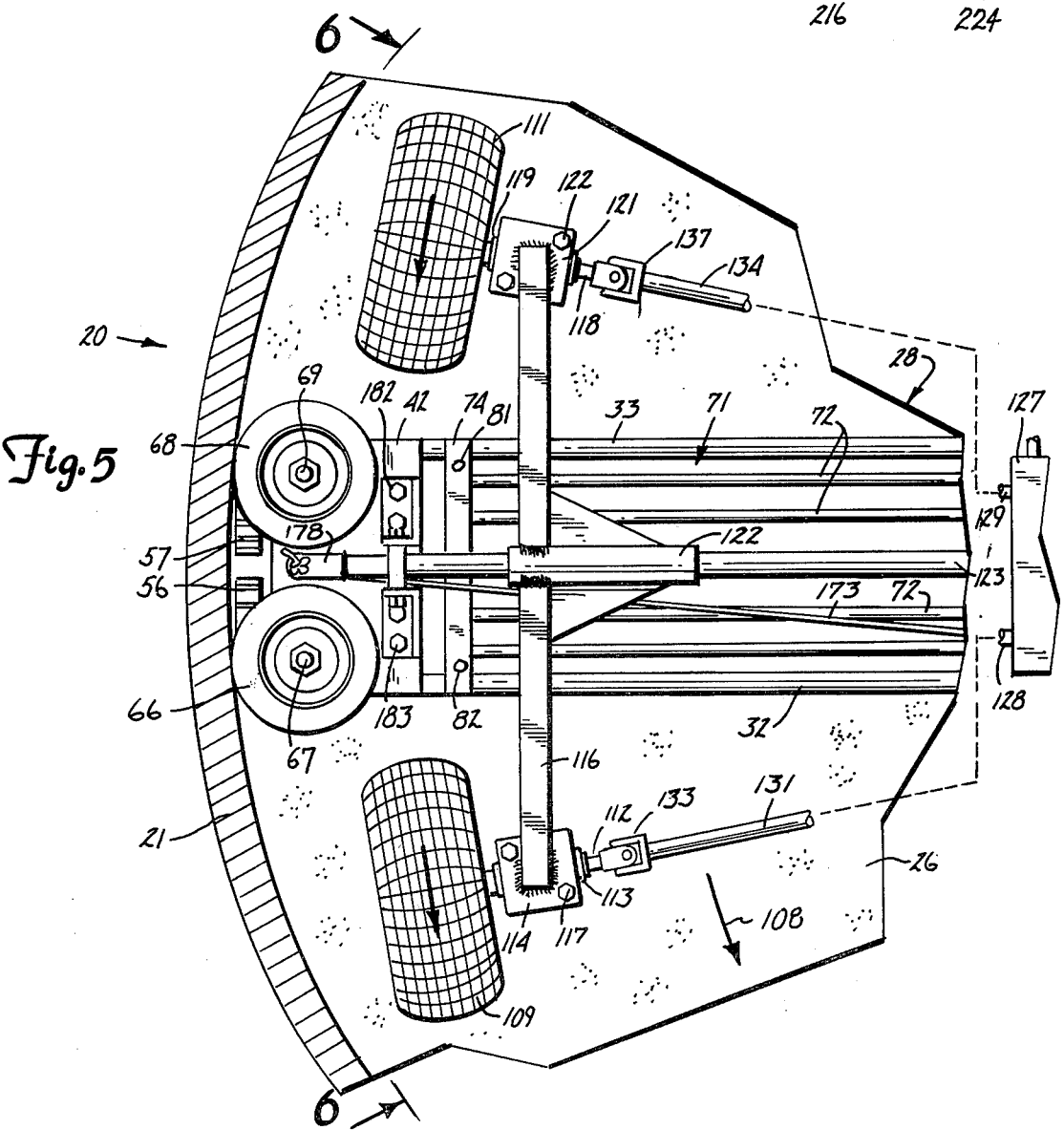

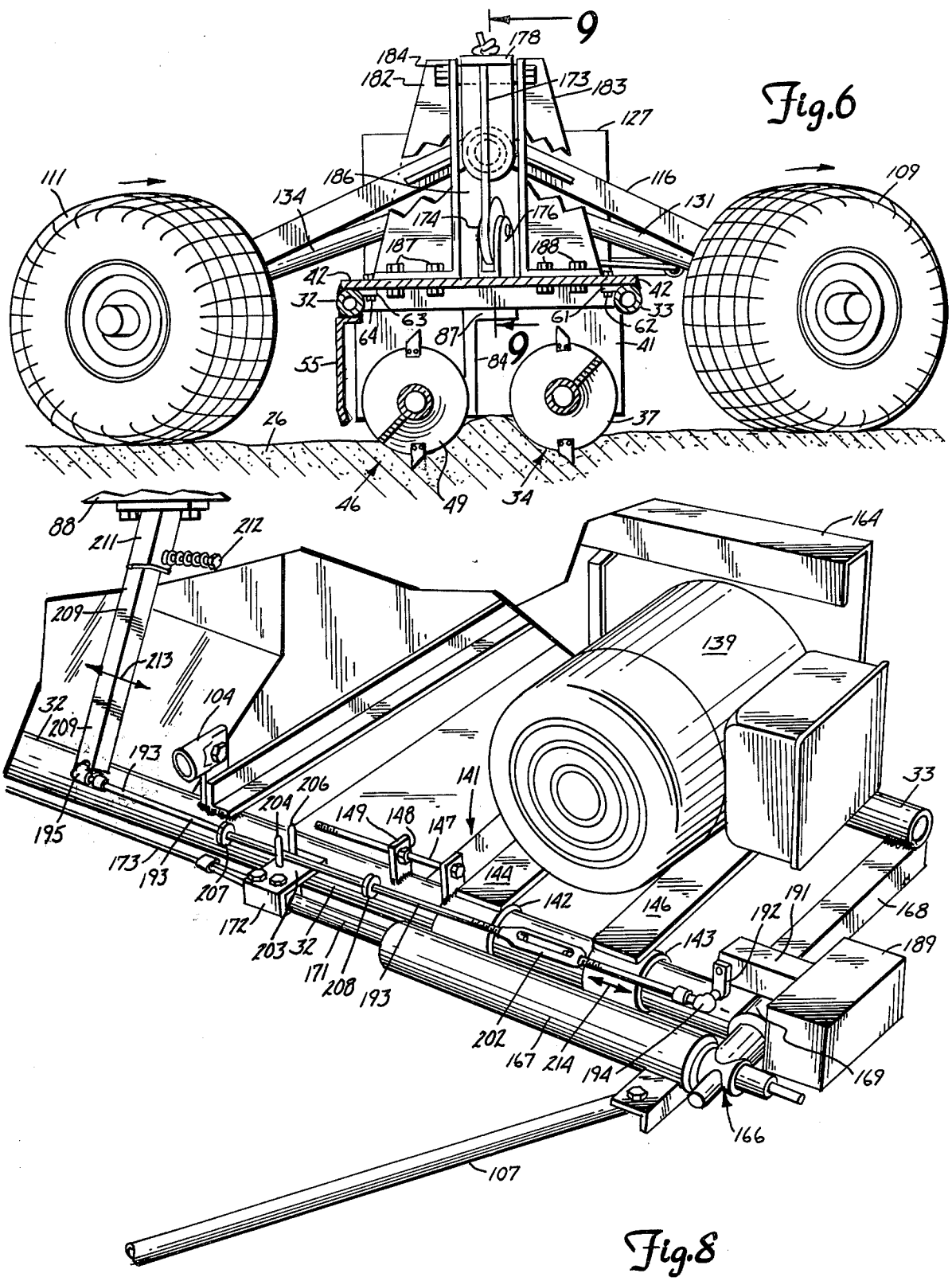

SILO UNLOADER

BACKGROUND OF INVENTION

A variety of materials, including silage and haylage, are stored in tower silos. These materials range from the hard binding material and padded and interlocked fibrous material, to loose and light material. The different types of materials have different densities and hardness, making it difficult to efficiently remove the material from the silos. In the Winter season, the material adjacent the silo wall can become frozen to a hard mass.

Top unloading silo unloaders are used to remove the top layer of material from the silo and discharge the material into the silo chute. The top unloading silo unloaders have their greatest material removing efficiency when they are operated in a generally horizontal level position and moved around the silo wall at a substantially constant or even speed. Uneven material flow and large bunches of material reduce the capacity of the top unloading silo unloader and can plug the unloader. The top unloading silo unloaders have collectors that move around the silo walls to collect and convey material to an impeller which throws the material to an out chute and into the silo chute. Maintaining the collector in a selected operating position, as a horizontal level position, or at a slight angle, and driving the collector around the wall at an even speed is desirable to insure even feeding of the material to the impeller. This insures that a high volume of material can be efficiently handled by the unloader.

PRIOR ART

The following U.S. Pat. Nos. show top unloading silo unloaders equipped with leveling and drive wheels:
- U.S. Pat. No. 2,651,438: Peterson
- U.S. Pat. No. 2,671,696: McLean
- U.S. Pat. No. 2,801,885: Harris
- U.S. Pat. No. 3,017,043: Buschbom
- U.S. Pat. No. 3,017,044: Engelmann
- U.S. Pat. No. 3,090,506: Buschbom
- U.S. Pat. No. 3,338,636: Chapman et al
- U.S. Pat. No. 3,462,199: Harris et al
- U.S. Pat. No. 3,670,907: Downing
- U.S. Pat. No. 3,896,942: Couture et al
- U.S. Pat. No. 4,170,385: Buschbom et al.

SUMMARY OF INVENTION

The invention relates to a material handling machine operable to gather material stored in a first location and move the gathered material to a second location. More particularly, the invention is directed to a top unloading silo unloader having a material collector operatively connected with drive wheels and an automatic leveling apparatus. The drive wheels are power driven to move the collector around the silo. The collector has conveying means, such as augers, to convey the material to an impeller. The impeller is operable to throw the material to an out chute and into the silo chute. The impeller is connected to a slip ring assembly that is pendently supported from the structure, as a tripod, mounted on top of the silo wall.

A leveling apparatus has an extendible and contractible means mounted on the silo unloader connected to the outer end of the collector with an elongated flexible means, such as a cable. The cable is anchored on a support carrying a walker beam. The drive wheels are rotatably mounted on opposite ends of the walker beam and fix the elevation of the support. A control unit having a fixed reference means actuates the leveling apparatus in response to the up and down movements of the collector. The control unit automatically functions to control the drive motor of the leveling apparatus in a manner to maintain the outer end of the collector in a selected position as it moves around the silo wall. The collector has wheel means that engage the wall to space the end of the collector from the wall. Adjustable mounts connect the wheel means to the outer end of the collector. The adjustable mounts include adjustable lock means which hold the wheel means in their selected adjusted position. The lock means includes an eccentrically mounted disc which retains the mount means in an adjusted position.

IN THE DRAWINGS

FIG. 2 is an enlarged sectional view taken along the line 2—2 of FIG. 1;

FIG. 3 is an enlarged sectional view taken along the line 3—3 of FIG. 2;

FIG. 4 is an enlarged sectional view taken along the line 4—4 of FIG. 1;

FIG. 5 is a plan view of the outer end of the collector of the silo unloader of FIG. 1;

FIG. 6 is a sectional view taken along the line 6—6 of FIG. 5;

FIG. 8 is a perspective view of the inner end of the silo unloader of FIG. 1 showing the leveling actuator and controls therefor; and FIG. 9 is an enlarged sectional view taken along the line 9—9 of FIG. 6; and FIG. 10 is an enlarged foreshortened sectional view taken along the line 10—10 of FIG. 2.

DESCRIPTION OF PREFERRED EMBODIMENT

Figure 1:
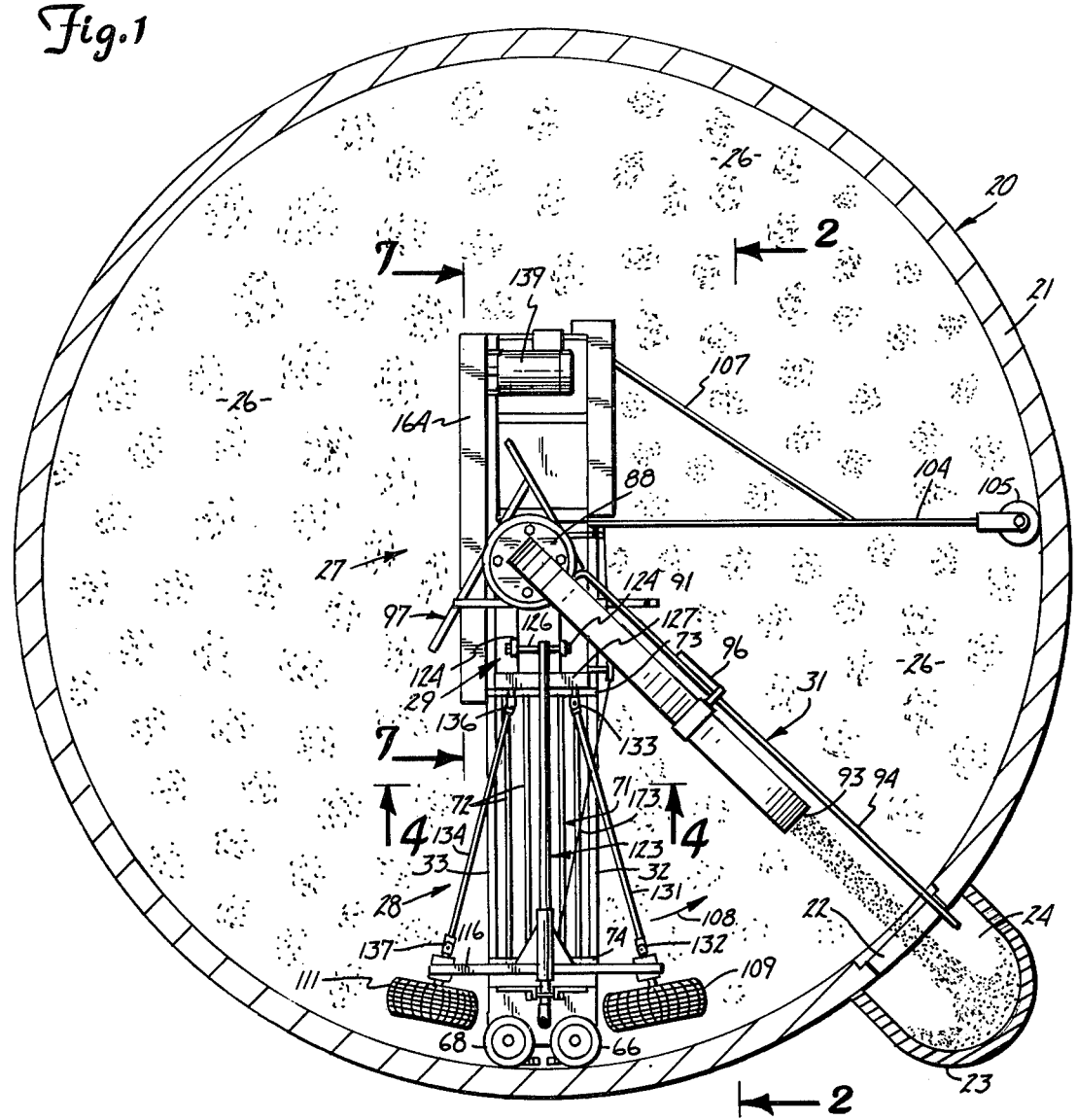
FIG. 1 is a top plan view of a top unloading silo unloader of the invention located in a tower silo.

Referring to FIGS. 1 and 2, there is shown a tower silo indicated generally at 20 having an upright cylindrical wall 21 providing a cylindrical storage chamber or material storage area for accommodating bulk feed materials 26, as silage, haylage, grains, and the like. Other types of particulate materials can be stored in silo 20. Wall 21 has a plurality of vertically aligned openings or doorways 22 providing access between the interior of silo 20 and an upright generally U-shaped chute 23. Chute 23 is an upright member attached to the outside of wall 21 providing an upright passage 24 in communication with doorways 22, so that material moved through an open doorway 22 will fall to the base of silo 20. Conveyor structures are used to move the material from the base of the silo to bulk feeders, vehicles, or the like.

A top unloading silo unloader indicated generally at 27 is operable to remove material from the top and discharge the material through doorway 22 into passage 24. Top unloading silo unloader 27 has a collector 28 operable to move around silo wall 21 and transport the material to the center area of the silo. An impeller 29 throws the material through a discharge chute 31 directed toward the open doorway 22.

Unloader 27 has a pair of generally parallel frame members 32 and 33, such as elongated tubular beams. The frame members 32 and 33 extend outwardly generally parallel to each other toward wall 21 to form part of the material collector 28. Collector 28 has an elongated forward auger 34 located below frame members 32 and 33. Auger 34 has an elongated shaft 36 carrying a first spiral flight 37 extended from the wall toward impeller 29. The inner end of shaft 36 is connected to a gear box 41 mounted on frame members 32 and 33. A second reverse helical flight 38 is located adjacent the inner end of impeller 29. Generally radial paddles 39 secured to shaft 36 are located between the flights 37 and 38. As shown in FIG. 3, outer end of shaft 36 is rotatably mounted in a bearing 44 retained in a generally upright leg 43 attached to a horizontal plate 42. A rear or trailing auger, indicated generally at 46 in FIG. 7, has a horizontal shaft 47 secured at its inner end to an output shaft 48 of gear box 41. A first helical flight 49 secured to shaft 47 extends from impeller 29 to the outer end of the collector 28. Flight 49 on rotation of the auger 46 moves the material inwardly in the direction of arrow 50. Reverse helical flights 51 are secured to shaft 47 adjacent the rear side of impeller 29. On rotation of shaft 47, the reverse helical flights 51 prevent material from passing impeller 29 in the direction of arrow 52 to function as a moving shield keeping the material from collecting behind impeller 29. Flights 51 are preferably four ¼ turn flights longitudinally spaced on shaft 47. Portions of adjacent flights overlap. Referring to FIG. 3, the outer end of shaft 47 is rotatably mounted in a bearing 53 secured to a lower end of a generally upright leg 54. Leg 54 is attached to horizontal plate 42. A plate 55 secured to frame member 33 is located behind auger 46.

Wall cleaning wheels 56 and 57, as shown in FIGS. 2 and 5, are secured to the outer ends of auger shafts 36 and 46 outwardly of arms 43 and 54, respectively. Wall cleaning wheels 56 and 57 are located in contiguous relationship relative to the inside surface of wall 21 and rotate with augers 34 and 46. Wall cleaning wheels 56 and 57 function to chip and clean any material, such as frozen material, that may adhere to the inside of wall 21. Wall cleaning wheels or rotatable cleaners 56 and 57 are spaced from the inside of wall 22 by a pair of generally horizontal wheels 66 and 68. Upright axle 67 secured to plate 42 rotatably supports wheel 66. A second upright axle 69 secured plate 42 rotatably mounts wheel 68. Adjustable assemblies 216 and 217, shown in FIG. 10, provide radial adjustment for wheels 66 and 68 thereby adjusting the wall clearance of wall cleaners 56 and 57.

As shown in FIG. 6, plate 42 extends over the top of the outer end of frame members 32 and 33. A pad 61 secured to frame member 33 is connected with a nut and bolt assembly to plate 42. A similar pad 63 is secured to frame member 32 and is attached with a nut and bolt assembly 64 to plates 42.

As shown in FIGS. 1 and 5, an open auger guard indicated generally at 71 is located over augers 34 and 46. The auger guard 71 comprises a plurality of laterally spaced longitudinal members 72 located between and generally parallel to frame members 32 and 33. The inner end of the members 72 is secured to a cross end member 73. The outer end of tubular members 72 is secured to a cross end member 74. Members 72 may be elongated tubular members. As shown in FIG. 4, opposite ends of cross member 73 are secured to inwardly directed ears 76 and 78 secured to frame members 32 and 33, respectively. Nut and bolt assemblies 77 and 79 secure the member 73 to ears 76 and 78. Nut and bolt assemblies 81 and 82, shown in FIG. 4, secure the cross end member 74 to ears (not shown) secured to frame members 32 and 33.

Impeller 29 has a scroll shaped impeller housing 83 having a side inlet opening 84. As shown in FIG. 2, opening 84 is located adjacent the inner end of helical flight 37 and leading auger 34 and adjacent paddles 39. Housing 83 rotatably supports a transverse shaft 86. An impeller having a plurality of pivotally mounted paddles is located within the housing. An example of the details of the impeller is disclosed by Hansen in U.S. Pat. No. 3,589,500. Impeller housing 83 has an upwardly directed outlet or neck 87 connected to a transition assembly 88. The transition assembly is a slip ring assembly having a non-rotatable part carrying a rotatable member. The non-rotatable part and rotatable member each have a central passageway allowing the material to move by the rotating impeller into an out chute 91. Examples of slip ring assemblies are shown in U.S. Pat. Nos. 3,517,369 and 3,594,680. A pivot 92 pivotally mounts the out chute on transition assembly 88. As shown in FIG. 1, out chute 91 extends in a generally radial direction and has an outer end 93 spaced from the wall 92 and aligned with an open doorway 22. A torque arm 94 is pivotally mounted on the non-rotating part of the transition assembly 88 and extends outwardly through the open doorway 22. A generally upright rigid link 96 connects torque arm 94 to out chute 91 to hold the out chute in operative relation relative to torque arm 94 and in alignment with open doorway 22.

A triangular frame assembly indicated generally at 97 is attached to the lower side of the non-rotatable member of slip ring 88. Frame assembly 97 has three angle members located about slip ring 88 in a triangular arrangement. Each angle member has an outer end attached to a cable 98. The upper ends of cable 98 are secured to a ring 99 connected to an elongated cable 101. Cable 101 is trained over a pulley 102 connected to a support mounted on the top of the silo wall 21 to pendently support the center portion of the silo unloader in the silo. Cable 101 extends from pulley 102 to a winch (not shown) secured to the outside adjacent the base of silo 20. An example of a winch connected to a cable supporting a silo unloader is shown in U.S. Pat. No. 3,235,299. The support 103 can be a frame structure on top of the silo wall or a tripod mounted on wall 21. Examples of tripod structure are shown in U.S. Pat. Nos. 3,128,081 and 3,211,407.

Returning to FIG. 1, an outwardly directed generally horizontal arm 104 is secured to the inner end of frame member 32 adjacent impeller 29. A guide wheel 105 is rotatably mounted for rotation about a generally upright axis on the outer end of arm 104. Wheel 105 engages the inside of wall 21. A brace 107 is secured to the inner end of frame member 32 and engages the mid-portion of arm 104. Arm 104 is located approximately 90 degrees in front of collector 28.

Figure 7:
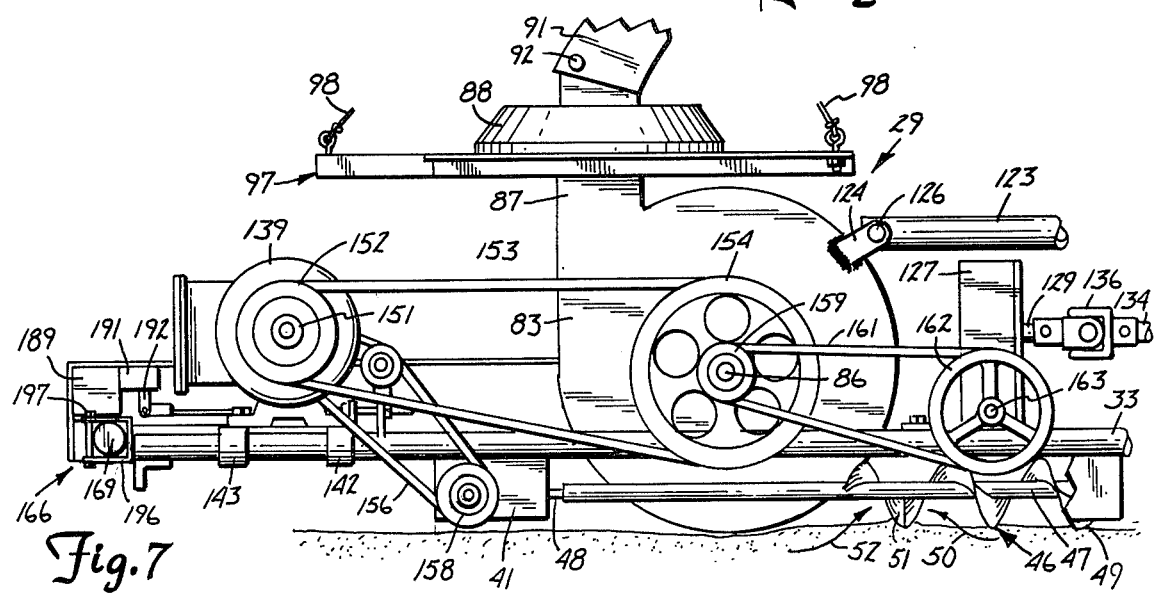
FIG. 7 is an enlarged sectional view taken along the line 7—7 of FIG. 1.

Collector 28 is moved around the silo in the direction of the arrow 108 with a pair of power driven drive wheels 109 and 111. As shown in FIG. 5, wheel 109 has a horizontal rotating axle 112 rotatably mounted in a bearing 113. A plate 114 secured to a forward end of a walking beam or rocker arm 116 is connected with nut and bolt assemblies 117 to bearing 113. Wheel 111 has a rotating axle 118 rotatably mounted in a bearing 119. Bearing 119 is secured to a plate 121 with nut and bolt assemblies 120. Nut and bolt assemblies 117 and 120 permit the angle of wheels 109 and 111 relative to wall 21 to be adjusted about upright axes. Plate 121 is attached to the rear end of beam 116. A generally horizontal sleeve 122 is attached to the mid-portion of beam 116. Sleeve 122 is rotatably mounted on a tubular member or lifting pipe arm 123 extended along the top of collector 28. As shown in FIGS. 1, 2, and 7, the inner end of member 123 is pivotally connected to impeller housing 83 with a pair of upright ears 124 and transverse pivot pin 126. The ears 124 are secured to housing 83. Pivot pin 126 allows the member 123 to pivot about a generally horizontal axis, whereby wheels 109 and 111 are continuously located in driving engagement with the top surface of material 26. Drive wheels 109 and 111 are not lifted off the material 26 by collector 28 or impeller 29.

A power transmission or gear box 127 is mounted on frame members 32 and 33 adjacent the front side of impeller housing 83. The weight of gear box 127 is transmitted to collector 28, as gear box 127 is located outwardly from the cable 101. Gear box 127 has a pair of outwardly directed drive shafts 128 and 129. A first drive shaft 131 having universal joints 132 and 133 at the opposite ends thereof drivably connects shaft 128 to wheel axle 112. A second drive shaft having universal joints 136 and 137 at the opposite ends thereof drivably connects gear box shaft 129 with wheel axle 118. On application of power to the gear box, the drive shafts 131 and 134 concurrently rotate wheels 109 and 111 to move collector 28 around the silo wall in the direction of arrow 108.

As shown in FIGS. 7 and 8, a motor 139, as an electric motor, is attached to a mount, indicated generally at 141, which is adjustably supported on the inner ends of frame members 32 and 33. The mount 141 comprises pairs of sleeves 142 and 143 positioned about the cylindrical frame members 32 and 33. Cross members 144 and 146 extend between and are secured to sleeves 142 and 143. A pair of rods 147 are secured to sleeves 142 and extend through a hole in an upright ear 149 fixed to frame members 32 and 33. Nuts 148 threaded onto the rods 147 are used to adjust the longitudinal position of mount 141 relative to frame members 32 and 33 to adjust the tension on the drive belts associated with the drive pulleys of the motor.

As shown in FIG. 7, motor 139 has a drive shaft 151 carrying a pulley 152. An endless belt 153 trained about pulley 152 surrounds a large driven pulley 154 mounted on the impeller shaft 86. A second belt 156 is trained about a second pulley 155 on motor drive shaft 151. Belt 156 is located about a pulley 158 mounted on the input power shaft of the gear box 41. The power is transmitted from impeller shaft 86 to gear box 127 through a pulley 159 mounted on shaft 86 and a belt 161 operatively connecting pulley 159 to a large pulley 162 mounted on the input shaft 163 of gear box 127. On operation of motor 139, gear box 41, impeller drive shaft 86, and the gear box 127 are concurrently operated, whereby the leading and trailing augers 34 and 46 are rotated about their longitudinal axes, the impeller in housing 83 is rotated to throw material into out chute 91 and drive wheels 109 and 111 are rotated to power collector 28 in the direction of arrow 108. As shown in FIGS. 1 and 8, all of the belt and pulley drive structure is located under a shield 164.

The level of collector 28 relative to member 123 is controlled with an extendible and contractible unit indicated generally at 166 in FIG. 8. Unit 166 is a linear actuator that is mounted in a generally horizontal sleeve 167 attached to a transverse cross member 168 secured to the inner ends of the frame members 32 and 33. Linear actuator 166 has a reversible D.C. motor 169 operable to selectively move an actuator rod 171 in opposite longitudinal directions. Linear actuator 166 has the details of linear actuator 113 disclosed in U.S. Pat. No. 4,170,385. The linear actuator 113 of U.S. Pat. No. 4,170,385 is incorporated herein by reference. The outer end of actuator rod 171 is attached to a block 172. A flexible power transmitting line or cable 173 secured to block 172 extends over collector 28 to a pulley 174, shown in FIG. 6. A U-shaped bracket 176 secured to the center of plate 42 carries a pivot bolt 177 for rotatably mounting pulley 174 on bracket 176. Cable 173 extends upwardly from pulley 174 to an outwardly directed arm 178 attached to an inwardly projected cylindrical member or tube 179. Cable 173 has an enlarged portion, as a knot or clamp, in engagement with the top of arm 178. As shown in FIG. 9, tube 179 projects into the outer end of tubular support 123 and is secured thereto with a nut and bolt assembly 181. Cylindrical member 179 is located between a pair of upright plates 182 and 183. As shown in FIG. 6, the upper ends of plates 182 and 183 are connected together with a horizontal nut and bolt assembly 184. Nut and bolt assembly 184 laterally spaces plates 182 and 183 from each other to provide a vertical slot or opening 186 allowing plates 182 and 183 and horizontal support plate 42 to move up and down relative to beam 116. A plurality of nut and bolt assemblies 187 and 188 secure the lower ends of plates 182 and 183 to horizontal plate 42.

Referring to FIG. 8, linear actuator 166 has a control box 189 mounted adjacent motor 169 for controlling the operation of motor 169. A switch 191 operatively connected to control box 189 has a downwardly directed movable arm 192. The arm 192 moves from a vertical neutral position to left and right positions to control the forward and reverse operation of D.C. motor 169. The linear actuator 166, motor 169, control box 189, and switch 191 are mounted as a unit in sleeve 167 and U-shaped bracket 196 secured to frame member 32. As shown in FIG. 7, motor 169 fits into bracket 196. A removable pin 197 in bracket 196 holds motor 169 in assembled relation with bracket 196. This entire unit can be removed by removing pin 197 and pulling the actuator from sleeve 167 and motor 169 from bracket 196. A horizontal linkage 193 is connected with a connector 194 to the lower end of arm 192. Linkage 193 extends forwardly to connector 195 pivotally mounted on the lower end of a link 209. Linkage 193 has a turn buckle 202 operable to selectively adjust the length of the linkage. Turn buckle 202 is used to adjust the cone or incline of the upper surface of the material 26 as a result of the operation of the collector 28. Block 172 attached to the longitudinal movable actuator 171 carries a generally horizontal plate 203. A pair of upright ears or pins 204 and 206 are secured to and project upwardly from plate 203. The linkage 193 extends between the pins 204 and 206. Stop washers 207 and 208 mounted on linkage 103 are adapted to engage the pins 204 and 206 to provide limits to the longitudinal movement of linkage 193 and operation of the linear actuator.

Link 209 is secured to a fixed arm 211 with a spring bias bolt 212. Arm 211 is attached to a rotating non-pivoting portion of the transition assembly 88 so that link 209 moves in a circular path along collector 28. Arm 211 is secured to the bottom of a rotating non-pivoting portion of transition assembly 88. An example of the rotating non-pivoting portion of a top silo unloader transition assembly is shown at 154 in FIGS. 9 and 10 of U.S. Pat. No. 4,170,385. These pivoting and non-pivoting rotating structures of the transition assembly 161 of U.S. Pat. No. 4,170,385 are incorporated herein by reference. Link 209 and arm 211 are fixed reference means, as they do not move up and down with collector 28 as it moves around the silo. The up and down movements of collector 28 relative to the non-pivoting reference or link 209 causes linkage 193 to move in opposite longitudinal directions, indicated by arrows 214, thereby moving the switch arm between its neutral and on positions.

In operation, when collector 28 digs into the top of the material 26, frame member 32 moves in a downward direction. Link 209, having a fixed length, will cause linkage 193 to move in a rearward longitudinal direction. This moves switch arm 192 to a position energizing motor 169 of the linear actuator. The motor drives the linear actuator to apply a pulling force on cable 173. Cable 173, being attached to arm 178, will cause the outer end of the collector 28 to be lifted or moved in an upward direction away from material 26. The weight of the outer end of collector 28 is applied to walker beam 116 to drive wheels 109 and 111. Drive wheels 109 and 111 remain in operative driving engagement with the top surface of material 26, since the outer end of collector 28 is free to move in an upward direction over a hard material.

Referring to FIG. 10, there is shown wall wheel adjusting assemblies 216 and 217 operable to allow radial adjustment of wheels 66 and 68 and hold the wheels in their adjusted positions. As shown in FIG. 5, the clearance of wall cleaners 56 and 57 relative to wall 21 is determined by the wall engaging wheels 66 and 67. This clearance is adjusted by changing the radial mounting locations of the wheel axles 66 and 67. Returning to FIG. 10, wheel adjusting assembly 216 has a flat bar 218 located on top of plate 42. The outer end of bar 218 has a hole 219 for axle 67. The lower end of axle 67 extends through a radial slot 221 in plate 42. The inner end of bar 218 has a radial slot aligned with a hole in plate 42 for a nut and bolt assembly 226. An upright shoulder or transverse rib 223 is secured to the upper side of the midsection of bar 218. A circular disc 224, having an off-center hole 225, is located in engagement with bar 218, with a portion of the outer edge of disc 224 in engagement with shoulder 223. The bolt of nut and bolt assembly 226 extends through off-center hole 225 and the nut thereof clamps the disc in an adjusted position. Wheel adjusting assembly 217 has the same structure as adjusting assembly 216, identified with the same reference numbers, with the suffix A.

In use, wheels 66 and 67 are radially located to provide the desired clearance between wall 21 and wall cleaner wheels 56 and 57. Bars 218 and 218A are radially adjusted on plate 42. Axles 67 and 69 move in slots 221 and 221A. The bars 218 and 218A move relative to nut and bolt assemblies 226 and 226A. Discs 224 and 224A are turned into engagement with shoulders 223 and 223A to fix the locations of bars 218 and 218A on plate 42. The nuts of nut and bolt assemblies 226 and 226A are turned down to lock the discs 224 and 224A against bars 218 and 218A. This locks the radial locations of wheels 66 and 68 relative to plate 42.

While there has been shown and described the preferred embodiment of the silo unloader of the invention, it is understood that changes in the collector and control means for controlling the operation and position of the collector relative to the material in the silo may be made by those skilled in the art without departing from the invention. The invention is defined in the following claims.

The embodiments of the invention in which an exclusive property or privilege is claimed are defined as follows:

1. A top unloading silo unloader for removing material from a tower silo having a cylindrical wall and an open doorway in said wall comprising: frame means having an inner end section locatable in the central section of the silo and an outer end section locatable adjacent the wall, impeller means mounted on the inner end section operable to move material toward an open doorway in the silo wall, collector means extended from the impeller means to the outer end section of the frame means operable to move material to the impeller means, support means connected to the impeller means and extended from the impeller means adjacent the collector means, means mounted on the outer end section of the frame means engageable with the support means to allow the collector means to move up and down relative to the support means, walker beam means rotatably mounted on the support means, said walker beam means having a first end located adjacent one side of the collector means and a second end located adjacent the other side of the collector means, drive wheel means rotatably mounted on the first and second ends of the walker beam means engageable with the material, drive means for rotating the drive wheel means to move the collector means around the silo about a generally upright axis, force transmitting means connected to the support means and movably connected to an outer end section of the collector means, extendible and contractible means mounted on the inner end section of the frame means having a movable member secured to the force transmitting means to hold the force transmitting means in tension whereby the outer end section of the collector means is supported by the drive wheel means, and control means for operating the extendible and contractible means in a manner to maintain the collector means in a desired position.

2. The unloader of claim 1 wherein: the support means is an elongated rigid member located above and extended generally parallel to the collector means, means pivotally connecting the rigid member to the impeller means, said member having an outer end portion engageable with the means mounted on the outer end section of the frame means whereby said drive wheel means operate to move the collector means around the silo.

3. The unloader of claim 2 wherein: the means mounted on the outer end section of the frame means includes upright means having laterally spaced portions providing an upright slot, said outer end portion of the rigid member extended through said slot and engageable with at least one spaced portion of the upright means.

4. The unloader of claim 3 including: arm means connected to the outer end portion of the rigid member, said force transmitting means being attached to the arm means.

5. The unloader of claim 3 including: plate means connected to the outer end section of the frame means, said upright means being attached to the plate means, said force transmitting means comprising a cable, and pulley means mounted on the plate means accommodating the cable.

6. The unloader of claim 2 including: sleeve means secured to the walker beam, said sleeve means having a passage accommodating the rigid member whereby the walker beam angularly moves relative to the rigid member.

7. The unloader of claim 1 wherein: the means mounted on the outer end section of the frame means engageable with the support means includes upright means having an upright slot accommodating the outer end of the support means and plate means securing the upright means to the outer end section of the frame means.

8. The unloader of claim 7 wherein: the outer end of the support means has an arm, said force transmitting means being connected to the arm.

9. The unloader of claim 8 including: pulley means secured to the plate means below the arm, said force transmitting means being engageable with said pulley means whereby tension force on the force transmitting means moves the outer end of the collector toward the support means.

10. The unloader of claim 9 wherein: the force transmitting means is a flexible cable.

11. The unloader of claim 1 including: sleeve means secured to the walker beam means, said sleeve means being rotatably mounted on the support means to allow the first and second ends of the beam means to move up and down as the drive wheel means move around the silo wall.

12. The unloader of claim 1 wherein: the drive means for rotating the drive wheel means includes a power transmitting gear box mounted on the frame means adjacent the impeller means, drive shaft means connecting the gear box to the drive wheel means, and motor means operably connected to the gear box to transmit power thereto.

13. The unloader of claim 1 including: sleeve means secured to the inner end of the frame means, said sleeve means having a passage accommodating the extendible and contractible means whereby the sleeve means mounts said extendible and contractible means on the frame means.

14. The unloader of claim 13 wherein: the extendible and contractible means is a linear actuator having a portion located in the passage of the sleeve means, said actuator having a motor and control means for said motor, said actuator being removable as a unit from said sleeve means.

15. The unloader of claim 1 wherein: the extendible and contractible means is a linear actuator having a reversible motor and control means for controlling the direction of operation of the motor, said control means having a control member movable from a neutral off position to on up or on down positions, reference means fixed with respect to said impeller, and linkage means connected to said frame means, control member, and reference means whereby movement of the frame means relative to the reference means will move the control member to an on position thereby operating the motor to change the length of the extendible and contractible means which changes the vertical location of the collector means relative to the support means and material in the silo.

16. The unloader of claim 15 wherein: the linkage means includes means to adjust the length of the linkage means to change the operating position of the collector means.

17. The unloader of claim 15 including: sleeve means secured to the inner end of the frame means, said sleeve means having a passage accommodating a portion of the actuator whereby the sleeve means mounts the actuator on the frame means, said actuator including the motor and control means being removable as a unit from said sleeve means.

18. The apparatus of claim 1 wherein: the extendible and contractible means includes a linear actuator, and means to mount the linear actuator on the inner end of the frame means having a passage to accommodate the linear actuator.

19. The apparatus of claim 18 wherein: said means to mount the linear actuator comprises an elongated tubular member having passages fastened to the frame, said linear actuator having a cylindrical portion located in said passage.

20. The unloader of claim 1 wherein: the collector means has rotatable auger means operable to move material to the impeller means, and open guard means located over the auger means attached to the frame means.

21. The unloader of claim 20 wherein: the open guard means comprises a plurality of spaced members extended generally parallel to the auger means.

22. The unloader of claim 1 including: wheel means engageable with the silo wall and mount means rotatably mounting the wheel means on the outer end of the collector means.

23. The unloader of claim 22 wherein: the mount means includes axle means for rotatably supporting the wheel means, and means to mount the axle means on the frame means in a selected adjusted position comprising bar means having a slot extended in the direction of adjustment of the wheel means and hole means for the axle means, shoulder means secured to the bar means adjacent the slot, disc means having an off-center hole means and an outer edge means engageable with the shoulder means, fastener means securing the bar means to the frame means and disc means to the bar means to hold the disc means in a fixed location thereby fixing the location of the wheel means relative to the frame means.

24. The unloader of claim 23 wherein: the wheel means comprises a pair of wheels and the axle means comprises a pair of upright axles, each axle rotatably supporting a wheel, and the means to mount the axle means on the frame means comprises separate bar means for each axle and disc means for each bar means to lock the bar means in a selected adjusted position.

25. A top unloading silo unloader for removing material from a tower silo having a cylindrical wall and an open door in said wall comprising: frame means having an inner end section locatable in the central section of the silo and an outer end section locatable adjacent the wall, means mounted on the inner end section operable to move material toward an open doorway in the silo wall, collector means extended from the means mounted on the inner end section to the outer end section of the frame means operable to move material to the means mounted on the inner end section, support means, means mounted on the outer end section of the frame means engageable with the support means to allow the collector means to move up and down relative to the support means, drive wheel means engageable with the material operably supported on the support means, drive means for rotating the drive wheel means to move the collector means around the silo, force transmitting means connected to the support means and movably connected to an outer end section of the collector means, extendible and contractible means mounted on the inner end section of the frame means having a movable member secured to the force transmitting means to hold the force transmitting means in tension whereby the outer end section of the collector means is supported by the drive wheel means, and control means for operating the extendible and contractible means in a manner to maintain the collector means in a desired generally horizontal position.

26. The unloader of claim 25 wherein: the support means is an elongated rigid member located above and extended generally parallel to the collector means, said rigid member having an outer end portion engageable with means mounted on the outer end section of the frame means whereby said drive wheel means operate to move the collector means around the silo wall.

27. The unloader of claim 26 wherein: the means mounted on the outer end section of the frame means includes upright means having laterally spaced portions providing an upright slot, said outer end portion of the rigid member extended through said slot and engageable with at least one spaced portion of the upright means.

28. The unloader of claim 27 including: arm means connected to the outer end portion of the rigid member, said force transmitting means being attached to the arm means.

29. The unloader of claim 27 including: plate means connected to the outer end section of the frame means, said upright means being attached to the plate means, and pulley means mounted on the plate means accommodating the force transmitting means.

30. The unloader of claim 25 including: beam means connecting the drive wheel means to the support means.

31. The unloader of claim 25 wherein: the means mounted on the outer end section of the frame means engageable with the support means includes upright means having an upright slot accommodating the outer end of the support means and plate means securing the upright means to the outer end section of the frame means.

32. The unloader of claim 31 wherein: the outer end of the support means has an arm, said force transmitting means being connected to the arm.

33. The unloader of claim 32 including: pulley means secured to the plate means below the arm, said force transmitting means being engageable with said pulley means whereby tension force on the force transmitting means moves the outer end of the collector toward the support means.

34. The unloader of claim 33 wherein: the force transmitting means is a flexible cable.

35. The unloader of claim 25 wherein: the drive means for rotating the drive wheel means includes a power transmitting gear box mounted on the frame means adjacent the means mounted on the inner end section, drive shaft means connecting the gear box to the drive wheel means, and motor means operably connected to the gear box to transmit power thereto.

36. The unloader of claim 25 including: sleeve means secured to the inner end of the frame means, said sleeve means having a passage accommodating the extendible and contractible means whereby the sleeve means mounts said extendible and contractible means on the frame means.

37. The unloader of claim 36 wherein: the extendible and contractible means is a linear actuator having a portion located in the passage of the sleeve means, said actuator having a motor and control means for said motor, said actuator being removable as a unit from said sleeve means.

38. The unloader of claim 25 wherein: the extendible and contractible means is a linear actuator having a reversible motor and control means for controlling the direction of operation of the motor, said control means having a control member movable from a neutral off position to on up or on down positions, reference means fixed with respect to said impeller, and linkage means connected to said frame means, control member, and reference means whereby movement of the frame means relative to the reference means will move the control member to an on position thereby operating the motor to change the length of the extendible and contractible means which changes the vertical location of the collector means relative to the support means and material in the silo.

39. The unloader of claim 38 wherein: the linkage means includes means to adjust the length of the linkage means to change the operating position of the collector means.

40. The unloader of claim 38 including: sleeve means secured to the inner end of the frame means, said sleeve means having a passage accommodating a portion of the actuator whereby the sleeve means mounts the actuator on the frame means, said actuator including the motor and control means being removable as a unit from said sleeve means.

41. The apparatus of claim 25 wherein: the extendible and contractible means includes a linear actuator, and means to mount the linear actuator on the inner end of the frame means having a passage to accommodate the linear actuator.

42. The apparatus of claim 41 wherein: said means to mount the linear actuator comprises an elongated tubular member having passages fastened to the frame, said linear actuator having a cylindrical portion located in said passage.

43. The unloader of claim 25 wherein: the collector means has rotatable auger means, said auger means including a trailing auger having a first helical flight operable to move material inwardly from the wall toward the central section of the silo and a second helical flight on the inner portion of the trailing auger operable to move material outwardly toward the wall.

44. The unloader of claim 25 wherein: the collector means has rotatable auger means operable to move material to the impeller means, and open guard means located over the auger means attached to the frame means.

45. The unloader of claim 44 wherein: the open guard means comprises a plurality of spaced members extended generally parallel to the auger means.

46. A top unloading silo unloader for removing material from a tower silo having a cylindrical wall comprising: frame means having an inner end section locatable in the central section of the silo and an outer end section locatable adjacent the wall, means mounted on the inner end section operable to move material from the silo, collector means extended from the means mounted on the inner end section to the outer end section of the frame means operable to move material to the means mounted on the inner end section, support means located adjacent the collector means, means mounted on the outer end section of the frame means engageable with the support means to allow the collector means to move up and down relative to the support means, drive wheel means engageable with the material, means mounting the drive wheel means on the support means, drive means for rotating the drive wheel means to move the collector around the silo, force transmitting means connected to the support means and movably connected to the means secured to an outer end section of the collector means, extendible and contractible means having a movable member secured to the force transmitting means to hold the force transmitting means in tension whereby the outer end section of the collector means is supported by the drive wheel means, control means for operating the extendible and contractible means in a manner to maintain the collector means in a desired position, and means mounting the extendible and contractible means and control means as a unit on the frame means and allowing the unit to be removed from the frame means.

47. The unloader of claim 46 wherein: the means mounting the extendible and contractible means include sleeve means secured to the inner end of the frame means, said sleeve means having a passage accommodating the extendible and contractible means whereby the sleeve means mounts said extendible and contractible means on the frame means.

48. The unloader of claim 47 wherein: the extendible and contractible means is a linear actuator having a portion located in the passage of the sleeve means, said actuator having a motor and control means for said motor, said actuator being removable as a unit from said sleeve means.

49. The unloader of claim 46 wherein: the extendible and contractible means is a linear actuator having a reversible motor and control means for controlling the direction of operation of the motor, said control means having a control member movable from a neutral off position to on up or on down positions, reference means fixed with respect to said impeller, and linkage means connected to said frame means, control member, and reference means whereby movement of the frame means relative to the reference means will move the control member to an on position thereby operating the motor to change the length of the extendible and contractible means which changes the vertical location of the collector means relative to the support means and material in the silo.

50. The unloader of claim 49 wherein: the linkage means includes means to adjust the length of the linkage means to change the operating position of the collector means.

51. The unloader of claim 49 wherein: the means mounting the extendible and contractible means includes sleeve means secured to the inner end of the frame means, said sleeve means having a passage accommodating a portion of the actuator whereby the sleeve means mounts the actuator on the frame means, said actuator including the motor and control means being removable as a unit from said sleeve means.

52. The apparatus of claim 46 wherein: the extendible and contractible means includes a linear actuator, and the means mounting the extendible and contractible means includes means to mount the linear actuator on the inner end of the frame means having a passage to accommodate the linear actuator.

53. The apparatus of claim 52 wherein: said means to mount the linear actuator comprises an elongated tubular member having passages fastened to the frame, said linear actuator having a cylindrical portion located in said passage.

* * * * *